(12) United States Patent
Jin et al.

(10) Patent No.: US 8,723,961 B2
(45) Date of Patent: May 13, 2014

(54) APPARATUS AND METHOD FOR FORMING AND DISPLAYING HIGH DYNAMIC RANGE (HDR) IMAGES

(75) Inventors: Elaine W. Jin, Fremont, CA (US); Ken Kryda, Sunnyvale, CA (US)

(73) Assignee: Aptina Imaging Corporation, George Town (KY)

(*) Notice: Subject to any disclaimer, the term of this patent is extended or adjusted under 35 U.S.C. 154(b) by 1273 days.

(21) Appl. No.: 12/071,788

(22) Filed: Feb. 26, 2008

(65) Prior Publication Data

US 2009/0213225 A1    Aug. 27, 2009

(51) Int. Cl.
*H04N 17/00* (2006.01)
*H04N 17/02* (2006.01)

(52) U.S. Cl.
USPC ........... 348/187; 348/174; 348/175; 348/177; 348/180

(58) Field of Classification Search
CPC ................. H04N 2101/00; H04N 2201/0001; G03B 23/14
USPC ........................... 348/187, 174, 175, 177, 180
See application file for complete search history.

(56) References Cited

U.S. PATENT DOCUMENTS

| | | | |
|---|---|---|---|
| 7,142,723 B2 | 11/2006 | Kang et al. | |
| 7,234,822 B2 | 6/2007 | Uchiyama et al. | |
| 7,236,285 B2 | 6/2007 | Uchiyama et al. | |
| 7,239,757 B2 | 7/2007 | Kang et al. | |
| 2001/0033265 A1* | 10/2001 | Mishima et al. | 345/92 |
| 2005/0195223 A1 | 9/2005 | Nitta et al. | |
| 2005/0212786 A1 | 9/2005 | Nitta et al. | |
| 2005/0247897 A1* | 11/2005 | Haug et al. | 250/584 |
| 2006/0034536 A1 | 2/2006 | Ogren et al. | |
| 2006/0055835 A1 | 3/2006 | Nitta et al. | |
| 2006/0103621 A1 | 5/2006 | Feng | |
| 2006/0153445 A1 | 7/2006 | Lin | |
| 2006/0203202 A1 | 9/2006 | Uchiyama et al. | |

(Continued)

FOREIGN PATENT DOCUMENTS

| | | |
|---|---|---|
| JP | 2000106637 | 4/2000 |
| JP | 2005250235 | 9/2005 |
| JP | 2007121375 | 5/2007 |

OTHER PUBLICATIONS

Visible Difference Predicator for High Dynamic Range Images, Mantiuk, R., Myszkowski, K., Seidel, H.-P., MPI Informatik, Saarbrucken, Germany; 2004 IEEE International Conference on Systems, Man and Cybernetics; Oct. 10-13, 2004; vol. 3, pp. 2763-2769 vol. 3. http://ieeexplore.ieee.org/xpls/abs_all.jsp?arnumber=1400750.

(Continued)

*Primary Examiner* — Pankaj Kumar
*Assistant Examiner* — Alazar Tilahun
(74) *Attorney, Agent, or Firm* — David C. Kellogg

(57) ABSTRACT

Apparatus and method of forming and displaying high dynamic range (HDR) images for various purposes including the testing of image capture devices, such as cameras. A display device has a display panel carrying a plurality of rendered images formed from image data of a scene. At least one light source is used to illuminate the rendered images on the display panel. When the rendered images are aligned with one another and illuminated by the light source, the rendered images are capable of forming a display image having a dynamic range higher than those of the rendered images.

19 Claims, 7 Drawing Sheets

(56) References Cited

U.S. PATENT DOCUMENTS

| | | |
|---|---|---|
| 2006/0214945 A1 | 9/2006 | Nitta et al. |
| 2006/0236573 A1* | 10/2006 | Bognar ............... 40/488 |
| 2006/0262363 A1* | 11/2006 | Henley ............... 358/516 |
| 2007/0000855 A1 | 1/2007 | Chen |
| 2007/0014470 A1 | 1/2007 | Sloan |
| 2007/0035706 A1 | 2/2007 | Margulis |
| 2007/0035707 A1 | 2/2007 | Margulis |
| 2007/0070364 A1 | 3/2007 | Henley |
| 2007/0103644 A1 | 5/2007 | Nakamura et al. |
| 2007/0222740 A1 | 9/2007 | Hanada |
| 2007/0242228 A1* | 10/2007 | Chen et al. ............... 353/20 |

OTHER PUBLICATIONS

Analysis of Reproducing Real-World Appearance on Displays of Varying Dynamic Range, Akiko Yoshida, Rafal Mantiuk, Karol Myszkowski and Hans-Peter Seidel, MPI Informatik, Saarbruken, Germany. Eurographics 2006/E. Groller and L. Szirmay-Kalos (Guest Editors), vol. 25 (2006), No. 3. http://www.mpi-inf.mpg.de/resources/hdr/subtmo/Yoshida-EG2006.pdf.

A High Resolution Video Display System by Seamlessly Tiling Multiple Projectors, Zhongding Jiang, Yandong Mao, Bo Qin, and Binyu Zang, Computer Graphics Lab, Software School, Fudan University, China. 2007 IEEE International Conference on Multimedia and Expo; Jul. 2-5, 2007; pp. 2070-2073. http://ieeexplore.ieee.org/xpls/abs_all.jsp?arnumber=4285089.

* cited by examiner

APPARATUS AND METHOD FOR FORMING AND DISPLAYING HIGH DYNAMIC RANGE (HDR) IMAGES

FIELD OF THE INVENTION

Embodiments of the invention relate generally to an apparatus and method of forming and displaying high dynamic range (HDR) images, which may be used for testing image capture devices.

BACKGROUND OF THE INVENTION

Image capture devices have been widely used to capture, process, store, and/or display images for various purposes. Examples of some image capture devices include, but are not limited to, still or video cameras of either digital or analog type, mobile telephone cameras, computer input devices, scanners, machine vision systems, vehicle navigation systems, surveillance systems, automatic focus systems, star trackers, motion detector systems, and image stabilization systems among others.

In a digital image capture device (e.g., digital camera), a solid state imaging device, also known as an imager, is typically employed and contains an array of imaging pixels. In each pixel, a photosensor, such as a photogate, phototransistor, photoconductor, or photodiode, is used to absorb incident radiation of a particular wavelength (e.g., infrared, optical photons, x-rays, etc.) impinging on that pixel when an optical image is focused on the pixel array. The photosensor converts the absorbed incident radiation to an electrical signal, which should be proportional to the intensity of the absorbed incident radiation. The electrical signals from all of the pixels in the pixel array are then processed by appropriate circuits to provide and/or modify information about the captured image for storage, printing, display, or other usage.

Image capture devices are tested and/or calibrated for various purposes, such as for designing and testing image processing algorithms or for benchmarking and/or controlling the quality of the image capture devices. For example, the image capture devices can be tested to judge their image performance, such as automatic exposure, automatic white balance, etc. During a test process, various test images are used as benchmarks to compare the image performance of different image capture devices or of the same image capture device over a period of time or under different image capture conditions. Test images used can include, but are not limited to, test charts, color patterns, and/or various indoor or outdoor scenes.

The same or similar set of test images are reproduced for repeated test processes. When a real scene is used as a test image, the scene is typically recorded and reproduced for display. For example, an outdoor real scene can be captured, processed as necessary, stored, and displayed as a test image. Because a real scene can comprise a high dynamic range of radiance of up to four orders of magnitude in brightness depending on the illumination condition, it is difficult to accurately reproduce real scenes on conventional display mechanisms having limited dynamic range. Thus, an improved method and apparatus for displaying a high dynamic range (HDR) image which may be used for testing purposes is desired.

DETAILED DESCRIPTION OF THE INVENTION

Figure 1:
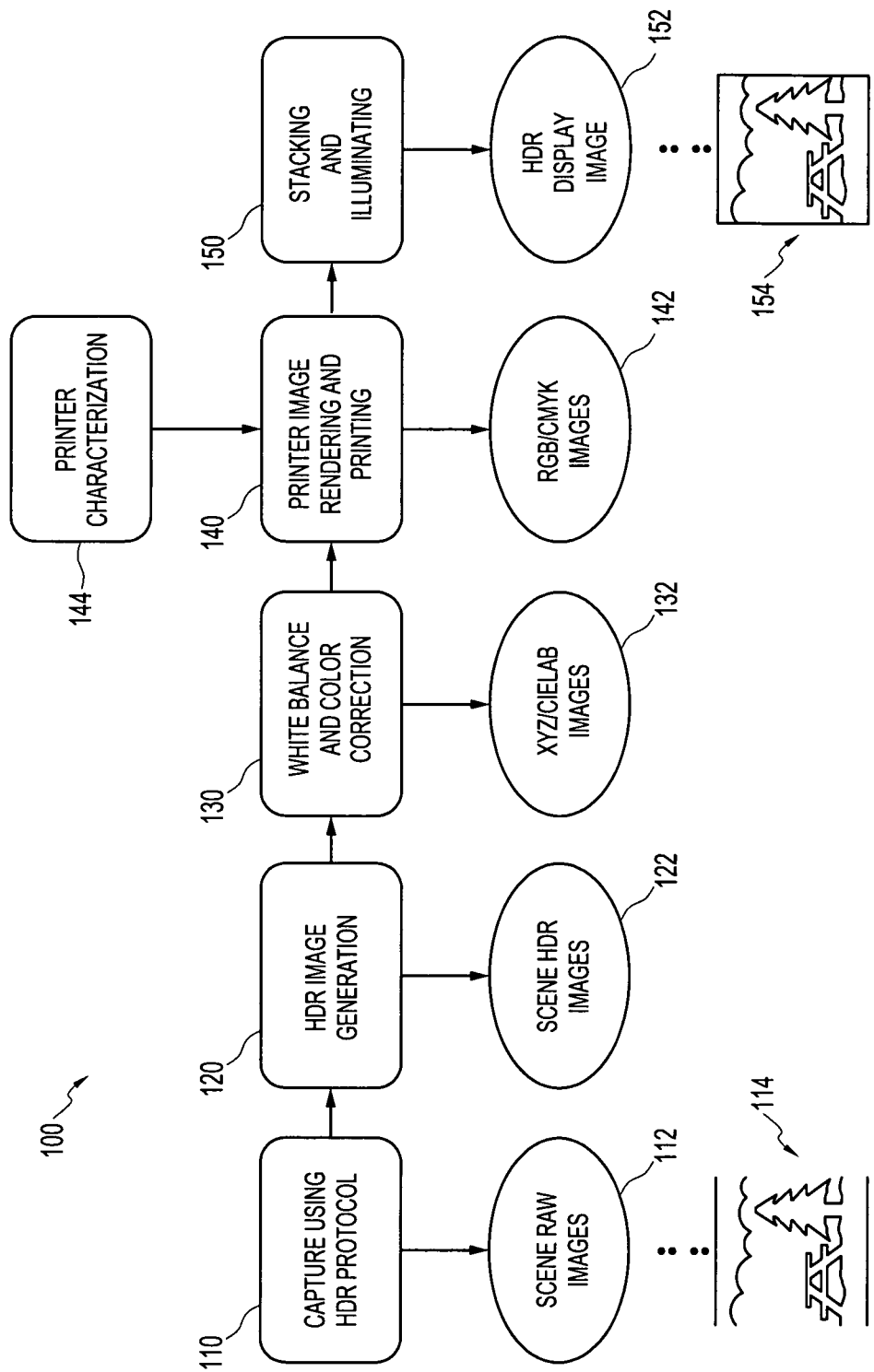
FIG. 1 illustrates an example of a process of forming and displaying a high dynamic range (HDR) image according to an embodiment described herein.

In the following detailed description, reference is made to the accompanying drawings, which form a part hereof and show by way of illustration specific embodiments and examples that may be practiced. These embodiments and examples are described in sufficient detail to enable those skilled in the art to practice them. It is to be understood that other embodiments and examples may be utilized, and that structural, logical, and electrical changes and variations may be made. Moreover, the progression of processing steps is described as an example; the sequence of steps is not limited to that set forth herein and may be changed, with the exception of steps necessarily occurring in a certain order.

Various embodiments and examples are now described with reference to the drawing figures, in which similar components and elements are designated with the same reference numeral and redundant description is omitted. Although certain examples below are described in relation to use with a complementary metal-oxide-semiconductor (CMOS) imaging device, such examples are not so limited but can be used with other solid state imaging device technology, for example, charge-coupled device (CCD) technology, as well.

The embodiments and examples described below provide an apparatus and method of forming and displaying high dynamic range (HDR) images of real scenes, as well as an improved apparatus and method of testing various image capture devices.

FIG. 1 illustrates a process flow 100 of forming and displaying a high dynamic range (HDR) image 152 according to one embodiment. At step 110, any of various methods can be employed to capture multiple raw images 112 of a real scene 114. The raw images 112 can be obtained using different exposure levels. For example, the multiple exposure levels can be determined based on any of various high dynamic range (HDR) protocols. In one example, a conventional digital camera (not shown) can be used to capture multiple raw images 112 of the same scene 114 following a high dynamic range (HDR) protocol in which each image is captured with a different exposure setting. The various captured raw images 112 captured are substantially the same as one another except for their exposure levels. The digital image data representing the raw images 112 can be stored for further processing.

The real scene 114 can be illuminated by any of various light sources. For example, the light sources employed for illuminating the real scene 114 can be daylight, tungsten light, fluorescent light, or a mixture of multiple light sources. In the example shown in FIG. 1, the real scene 114 depicts an outdoor scene in bright daylight. The spectral information about the light source for the real scene 114 can be obtained and recorded at the same time the various raw images 112 are being captured, and can be associated with the captured images. The recorded spectral information can be stored and used to determine the level and/or spectrum of illumination when constructing the high dynamic range (HDR) display image 152 as will be described below.

At step 120, the multiple raw images 112 at respectively different exposure levels are combined to create a single high dynamic range (HDR) image 122 of the real scene 114 by any of various methods. As but one example, an image processing program, such as Photoshop®, can be used to overlay the raw images 112 taken at various exposures to produce an image 122 with a higher dynamic range. Other known programs can also be employed to combine the raw image data of the raw images 112 and construct the high dynamic range (HDR) image 122. The raw image data of the raw images 112 can also be processed to reduce the noise level in the image data. The raw image data can also be processed to remove the saturation in one or more of the raw images 112. Photoshop® can be used to do this as well. One skilled in the art will appreciate that various other methods and algorithms can also be employed to process the raw images 112 to obtain the high dynamic range (HDR) image 122.

The scene HDR image 122 undergoes various image processing including e.g., white balance and color correction in step 130 to produce a device independent image 132. The HDR image 122 is then converted from an RGB color space into either the XYZ color space or the CIELAB color space, both of which are developed by the International Commission on Illumination (CIE). One skilled in the art will appreciate that any of various known color space conversion techniques can be employed for the above purposes.

At step 140, the device independent image 132 is processed to obtain a plurality of rendered images 142, which can be printed onto a respective plurality of transparent image carriers 420 (FIG. 4) using e.g., a printing device. Each image carrier 420 can thus support a rendered image 142 for use in a display. To facilitate obtaining the rendered images 142 for printing purposes, the printing device is characterized to correlate the device independent color space (i.e., XYZ or CIELAB values) of the device independent image 132 with the digital code values (e.g., RGB or CMYK values) of the printing device.

Figure 1A:
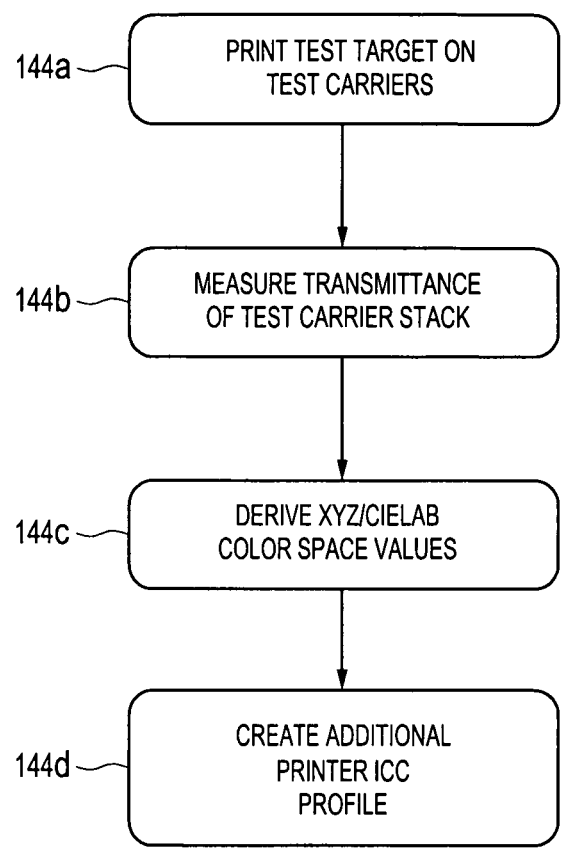
FIG. 1A is a flowchart of an example printer characterizing process shown in FIG. 1.

FIG. 1A shows an example in which the printing device is characterized prior to printing rendered images 142 onto a plurality of image carriers 420. At step 144a, the printing device is operated to print a same test target onto a plurality of test carriers. For example, the test target comprises at least one color patch, whose printed color values are device dependent and can be in the format of RGB or CMYK values. The test carriers can be formed of the same transparent plastic material used for the image carries 420. In one example, the test carriers can be in the form of transparent films or layers of transparency. Additionally, the test carriers are printed using the same types of ink or other color materials as will be used to print the rendered images 142.

The printed test carriers are stacked so that the printed test targets are aligned with one another. The number of the test carriers to be stacked together is determined based on the number of the rendered images 142 which will be printed for constructing the display device 400 (FIG. 4) and in accordance with a device luminance contrast desired in the high dynamic range (HDR) display image 152. For example, three, four, or five test carriers can be used to characterize the printing device, resulting in different luminance contrast in the final high dynamic range (HDR) display images 152. One skilled in the art will appreciate that additional test carriers can be employed to characterize the printing device.

Figure 2:
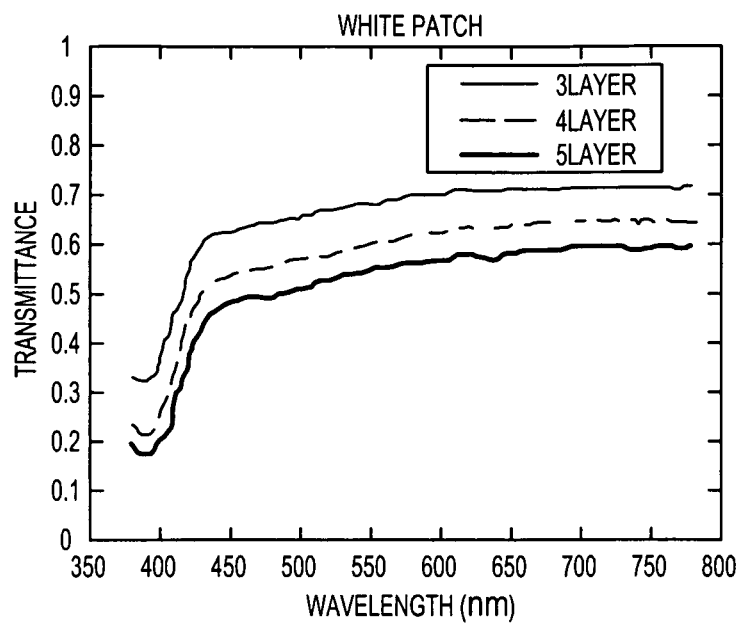
FIG. 2 shows spectral transmittance for white patches on three different display panels respectively formed by three, four, and five image carriers.
Figure 3:
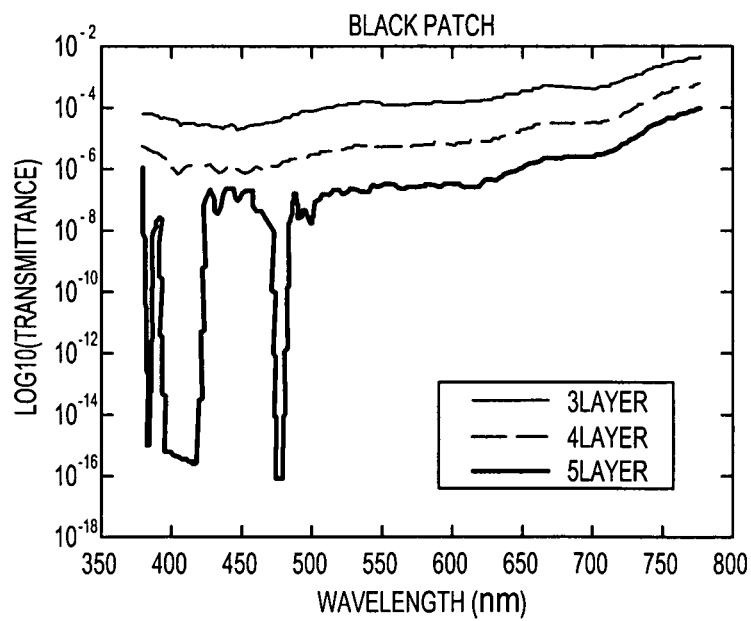
FIG. 3 shows spectral transmittance for black patches on three different display panels respectively formed by three, four, and five image carriers.

At step 144b, the transmittance of the printed test targets on the aligned and stacked test carriers is measured by any of various methods to obtain transmittance data for such test targets. FIG. 2 shows the spectral transmittance for the corresponding white patches on a stack of three test carriers (see the vertical bar on the left side of the chart). FIG. 3 shows the spectral transmittance for the corresponding black patches on a stack of three test carriers. One skilled in the art will appreciate that spectral transmittance can be obtained for any of various other colors using appropriate test targets or color patches.

The measured transmittance data of the printed test targets can be processed to derive device independent XYZ or CIELAB color space values for such printed test targets, as is shown in step 144c. For example, the transmittance data of the printed test targets can be associated with a number of factors including the spectral power distribution of the backside illumination used for the display image 152 and the CIE color matching functions as is specified by the International Commission on Illumination (Commission Internationale de l'Eclairage). As a result, a correlation can be established between the device independent color space (e.g., XYZ or CIELAB values) and the device dependent color values (e.g., RGB or CMYK values) for such printed test targets. In one example, such correlation can be established in the form of a look-up table. One skilled in the art will appreciate that various other techniques and methods can be employed to derive device independent color space values for the corresponding test targets tested.

Any of various methods can be used to obtain the correlation of XYZ or CIELAB color space values and RGB or CMYK values of additional different colors other than those in the test targets. In one example, the derived XYZ or CIELAB color space values and the corresponding RGB or CMYK values of the test targets can be used for interpolating the correspondence of colors beyond those included in the test targets. Various methods and techniques can be employed for such a purpose. For example, the software "ProfileMaker" released by GretagMacbeth can be used for this operation. In another example, additional test targets can be used which include additional different colors. These additional test targets can be subjected to the same or similar process steps as described above in connection with steps 144a through 144c to establish the correlation between the device independent color space and the device dependent color values for such additional test targets. The correlation between the device independent color space values and device dependent color values can thus be established for all colors.

In one example shown in step 144d, an additional ICC (International Color Consortium) profile can be formed for the printing device to correlate the XYZ or CIELAB color space values with the RGB or CMYK printer color values. The additional printer ICC profile can be in the form of a three dimensional look-up table. One skilled in the art will appreciate that the correlation between the XYZ or CIELAB color space values and the RGB or CMYK printer color values can be established in various other forms or formats to facilitate in forming rendered images 142 as described below.

One skilled in the art will appreciate that different numbers of test carriers can be used to characterize the printing device. For example, FIG. 2 also shows the spectral transmittance for the white patches on stacks of four and five test carriers, while FIG. 3 shows the spectral transmittance for the black patches on stacks of four and five test carriers. The number of the test carriers can be determined based on various factors, such as the luminance contrast of the display image 152.

Referring again to FIG. 1, the correlation of the XYZ or CIELAB values and the RGB or CMYK printer color values can be used to convert the device independent image 132 to a rendered image 142 (step 140). For example, the conversion can be carried out by referring to the three dimensional lookup table of the printer ICC profile established as described above. In one example, a printing device can be characterized to obtain such a printer ICC profile. The characterized printing device can be used to print a rendered image 142 onto a respective one of the multiple image carriers 420 (FIG. 4), which can form a high dynamic range (HDR) display image 152 as described in greater detail below. In one example, the rendered images 142 are printed using the same type of ink or other coloring material as is used for the test images. One skilled in the art will appreciate that the rendered images 142 can be formed or affixed onto the image carriers 420 by methods other than printing.

The image carriers 420 used can be formed of any of various transparent materials, as those used to form the test carriers. For example, the image carriers 420 can have a transmittance of about 90% or more. In one example, the image carriers 420 can be formed of a transparent plastic material. As is described in the examples described below, the image carriers 420 can be transparent films or layers of transparency.

At step 150 (FIG. 1), a high dynamic range (HDR) display image 152 is formed using the rendered images 142. For example, multiple image carriers 420 can be employed and stacked with one another to align the rendered images 142 on the image carriers 420. In one example, the number of image carriers 42 used is the same as that of the test carriers used when characterizing the printing device. The aligned rendered images 142, when illuminated, can form a display image 152 having a high dynamic range (HDR), such as having a luminance contrast of up to about 8500:1.

Additionally or alternatively, the display image 152 formed can have a broad range of luminance level from about 1 cd/m$^2$ at the low end to about 11,000 cd/m$^2$ at the high end. In one example, the peak luminance level of the display image 152 can be in the range from about 8,000 cd/m$^2$ to about 11,000 cd/m$^2$. In the example of FIG. 1, the rendered images 142 are illuminated by one or more xenon arc lamps, which can simulate the sunlight that the captured real scene 114 (i.e., an outdoor scene under direct sunlight) is exposed under. The resultant display image 152 can thus be a high dynamic range (HDR) image 154 having a luminance contrast that closely resembles that of the real scene 114 captured. One skilled in the art will appreciate that various other indoor or outdoor real scenes can be captured and processed to create high dynamic range (HDR) images for display.

Figure 4:
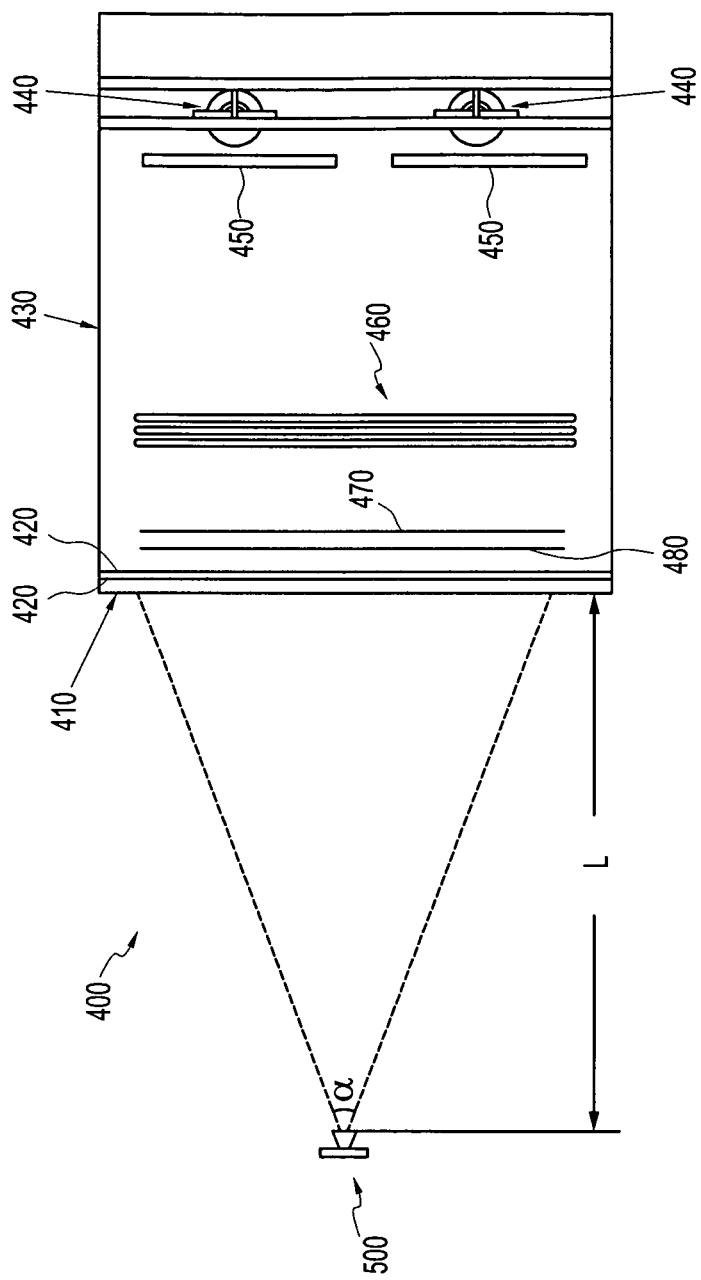
FIG. 4 is a top down view of an example of a high dynamic range (HDR) image display device formed according to an embodiment described herein.
Figure 5:
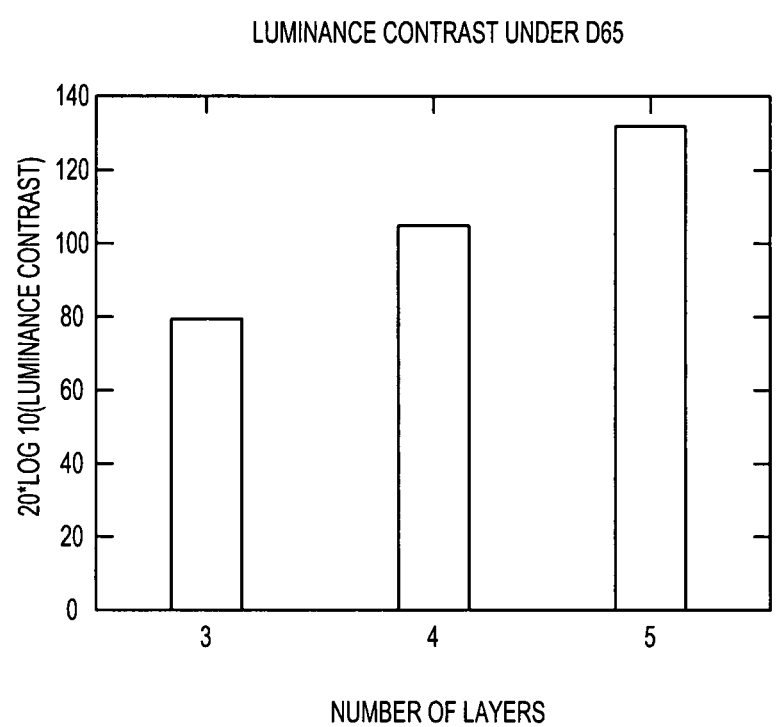
FIG. 5 shows the resulting luminance contrast of the different display panels respectively having three, four, and five image carriers.

FIG. 4 illustrates an embodiment of an image displace device 400 capable of displaying a high dynamic range (HDR) display image 152. The display device 400 can comprise a display panel 410 formed by two or more image carriers 420. The image carriers 420 each carry a rendered image 142 and are properly stacked with one another as is described above. For example, the rendered images 142 on the image carriers 420 are aligned with one another and, when properly illuminated, form a high dynamic range (HDR) display image 152. In one example, the stacked image carriers 420 can be fixedly joined with one another to form a unitary display panel 410 and maintain the alignment of the rendered images 142 on the image carriers 420. Although FIG. 5 shows examples of display panels 410 respectively formed by three, four, five image carriers 420, one skilled in the art will appreciate that the display panel 410 can be formed by fewer or additional image carriers 420.

The image carriers 420 and the display panel 410 can be mounted or otherwise supported on a housing 430 of the display device 400 during its use. In one example, the various image carriers 420 can be removably supported on the housing 430 by any of various releasable mechanisms e.g. releasable clips. When a second display panel 410 is provided which carries rendered images 142 formed from a different real scene 114, the display device 400 can display different high dynamic range (HDR) display images 152, such as different indoor or outdoor scenes 114. One skilled in the art will appreciate that additional display panel 410 and/or image carriers 420 can be provided to form different high dynamic range (HDR) display images 152 as desired.

One or more light sources 440 can be provided in the display device 400 to illuminate the rendered images 142 to form the high dynamic range (HDR) display image 152. Any of various light sources 440 can be used to provide different types of illumination, such as simulated daylight, tungsten light, or fluorescent light. For example, as noted above, one or more xenon arc lamps can be used to simulate sunlight. Additionally or alternatively, the light sources 440 can be determined to illuminate the display panel 410 at any desired illuminance levels. In one example, the display panel 410 can be illuminated by a light source 440 having an illuminance level up to 100,000 lux, which is similar to the illuminance level from direct sunlight. For example, a xenon arc lamp provides an illuminance level as high as 100,000 lux. In another example, a single light source 440 is used to generate illumination of different intensity and/or spectrum. One skilled in the art will appreciate that the light sources 440 can be formed or used in various other ways to illuminate the rendered images 142 on the display panel 410.

As FIG. 4 shows, additional optical components and devices can be used in the display device 400. For example, an infrared (IR) reflector 450 and/or absorber 460 can be employed to filter out the infrared component emitted from the light sources 440 or otherwise prevent the infrared component from reaching the display panel 410. Additionally, a proper light filter 470 can be selected and used to remove one or more radiation components emitted from the light sources 440. FIG. 4 also shows a light diffuser 480 used in the display device 400 to create an indirect illumination and provide a more realistic illumination to the rendered images 142 on the display panel 410. One skilled in the art will appreciate that additional optical devices can be used to alter or modify the illumination from the light sources 440.

When the light sources 440 are operated to illuminate the rendered images 142 on the display panel 410, a high dynamic range (HDR) image 152 is created. For example, the resultant display image 152 can have a luminance contrast of at least about 8500:1. FIG. 5 shows luminance contrast of three display images 152 displayed on three different display panels 410 respectively having three, four, and five image carriers 420, under a standard illuminant D65 defined by the International Commission on Illumination (CIE). In the example where three image carriers 420 are used, the luminance contrast of the display image 152 is about 8500:1. The luminance contrast further increases when additional image carriers 420 are used to form the display panel 410. For example, the luminance contrast can be about 172,000:1 when four image carriers 420 are used. In one example where five image carriers 420 are used, the luminance contrast of the display image 152 can reach about 3,523,000:1. The high dynamic range (HDR) of the display image 152 can provide a more accurate reproduction of the real scene 114.

Additionally or alternatively, the display image 152 can be formed using a scene luminance similar to that of the captured real scene 114. For example, the display image 152 can have a luminance in the range from about 1 cd/m$^2$ at the low end to about 11,000 cd/m$^2$ at the high end, or from about 8000 cd/m$^2$ to about 11,000 cd/m$^2$. The various luminance levels in various real scenes 114 can thus be reproduced in the display image 152.

In one example, the rendered images 142 on the display panel 410 can be illuminated by the same and/or similar type of illuminance applied to the corresponding real scene 114 when it is captured. In such an example, and as discussed above, the spectral information about the illuminance for a real scene 114 can be obtained at the same time that the real scene 114 is captured. The obtained spectral information can be recorded and later used to determine the level of illuminance for the rendered images 142 when creating the display image 152. For example, if a living room scene is captured under a tungsten light, a similar tungsten light source can be selected and used to illuminate the rendered images, which are obtained based on the image data of the captured living room scene. Illuminating the rendered images 142 with the same type of illuminance of the captured real scene 114 can create a more realistic reproduction of the captured real scene 114.

The various high dynamic range (HDR) display images 152 formed can serve any of various purposes, such as for decoration, advertisement, as well as for testing imaging units 500. For example, the display image 152 can be formed based on a captured scenic landscape. When such a display image 152 is in use, the captured scenic landscape is reproduced as a high dynamic range (HDR) image and can serve the same purpose as a piece of conventional art work. In another example, the display image 152 can be formed to carry promotional information of a product or service and be used as a commercial billboard for advertising the product or service. One skilled in the art will appreciate that the high dynamic range (HDR) display images 152 and/or the display device 400 can have various other application usage.

Figure 6:
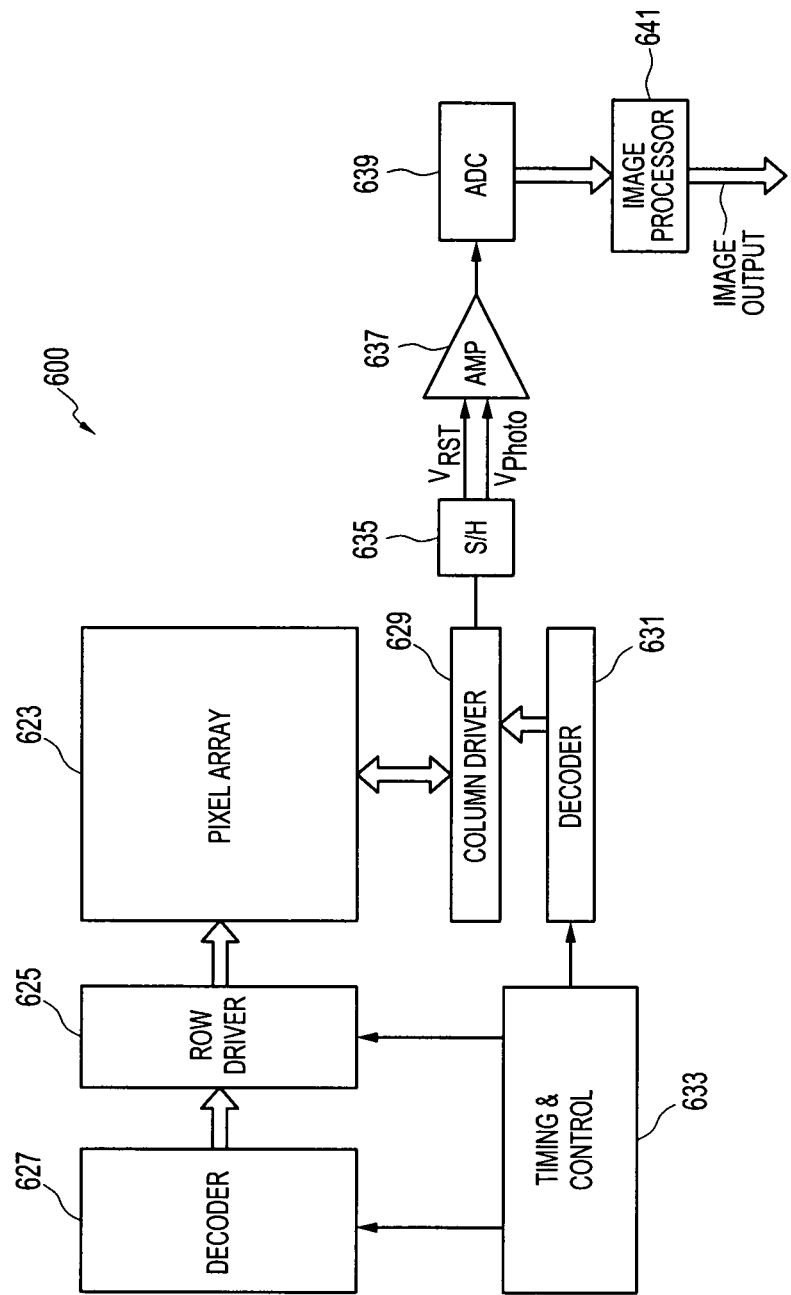
FIG. 6 is a block diagram of the imaging device for use in an imaging capture device.
Figure 7:
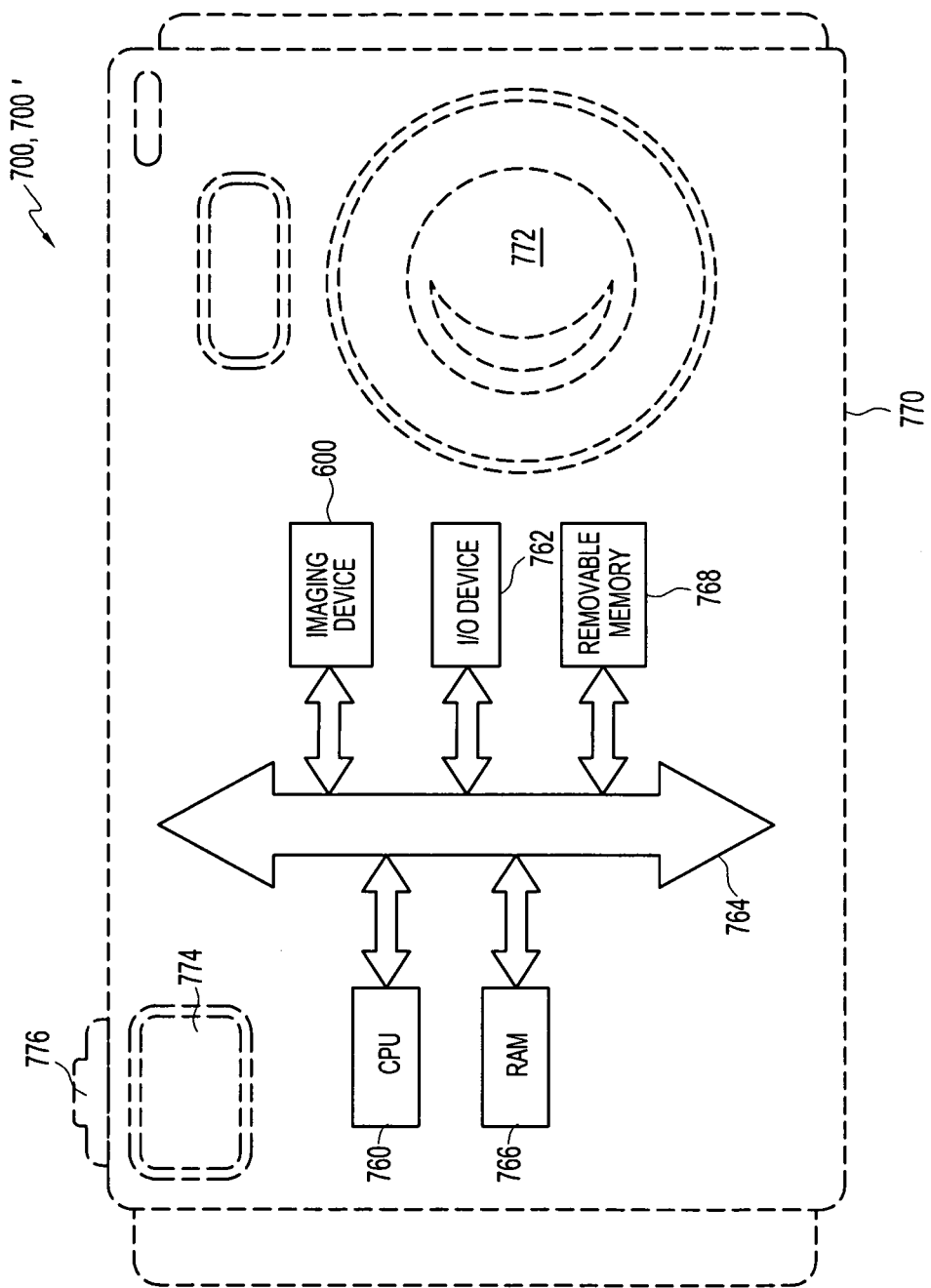
FIG. 7 is an illustration of the image capture device containing an imaging device shown in FIG. 6.

In the example shown in FIG. 4, the display device 400 can generate a high dynamic range (HDR) display image 152 for use as a test image for various imaging units 500. The imaging unit 500 can be any element or device for capturing an image. For example, the imaging unit 500 can be an imaging device 600 (FIG. 6) for use in an image capture device 700 or an image capture device 700 (e.g., cameras 700') as shown in FIG. 7. One skilled in the art will appreciate that various other types of imaging units 500 can also be tested using the display device 400 described herein.

The display image 152 can be used for designing and optimizing image processing algorithms within the imaging unit 500 and/or executed by a device CPU 760 (FIG. 7) or for benchmarking and/or controlling quality of such imaging unit 500. When being used for such a purpose, the imaging unit 500 being tested can be positioned facing the display panel 410 of the display device 400 and spaced therefrom for a test distance L, as shown in FIG. 4. The test distance L of the display device 400 can be determined based on a number of factors, including the size of the display image 152 and the field of view (FOV) of the imaging unit 500 to be tested. For example, when the display image 152 is formed to have a horizontal width of about 101 cm and a vertical height of about 76 cm (i.e., an area size of about 40 in×30 in), the test distance L can be about 88 cm for an imaging unit 500 with the horizontal field of view of about 60 degrees (i.e., α=60°).

In such a case, the display image 152 can substantially fill the entire image frame captured by the imaging unit 500 in at least the horizontal direction. One skilled in the art will appreciate that the test distance L of the display device 400 can also be determined based on the vertical field of view of the imaging unit 500 or other factors.

In the above example where the display image 152 is used as a test image for an imaging unit 500, the spatial resolution of the display image 152 is formed to be higher than the resolution of the pixel array 623 (see, FIG. 6) of the imaging unit 500 being tested. As one skilled in the art will appreciate, the spatial resolution of the display image 152 is determined by the spatial resolution of the printing device used to print the rendered images 142 on the image carriers 420. Accordingly, at the time of printing the rendered images 142, the printing device is chosen to have a spatial resolution higher than the resolution of the pixel array 623 of the imaging unit 500 to be tested. In such a case, each imaging pixel can capture an image area of the display image 152 comprising multiple printer pixels.

In one example, the imaging unit 500 being tested has a pixel array 623 (FIG. 6) with a resolution of 3 million pixels (e.g., 2048×1536). The printing device used for printing the rendered images 142 is determined to have a spatial resolution of 300 DPI (dots per inch). When the imaging unit 500 is positioned at a test distance L of about 88 cm, each pixel in the imaging unit 500 can cover a total of 6×6=36 printer pixels on the display image 152, which is constituted by the rendered images 142. In such a case, the spatial structure of the printer pixels in the printing device will not affect the testing results of the imaging unit 500. One skilled in the art will appreciate that the display image 152, when being used for various other purposes, can also be formed to have other spatial resolution.

For testing, the display image 152 can be displayed continuously and/or repeatedly to reproduce a high dynamic range real scene 114 as desired. The imaging unit 500 can then be tested against the display image 152, which has a high dynamic range (HDR) image closely resembling the captured real scene 114. In one example, the imaging unit 500 can be tested and/or calibrated for various purposes, such as for designing and optimizing its image processing algorithms, including automatic exposure and automatic white balance. In another example, multiple imaging unit 500 can be tested against the display image 152 for purposes of benchmarking and/or controlling the quality of such multiple imaging unit 500. One skilled in the art will appreciate that the imaging unit 500 can be tested for other purposes and various types of image imaging unit 500 can also be tested.

In one example, the imaging unit 500 tested can be an imaging device 600. FIG. 6 is a block diagram of a CMOS imaging device 600, which can be used in the image capture device 700. Other imaging acquisition technology and architecture, e.g., a charge-coupled device (CCD), and others can also be used. The imaging device 600 contains a pixel array 623 having pixel cells formed to have various constructions and arranged in a predetermined number of columns and rows. The pixel array 623 can capture incident radiation from an optical image and convert the captured radiation to electrical signals, such as analog signals.

The electrical signals obtained and generated by the pixel array 623 can be read out row by row to provide image data of the captured optical image. For example, pixel cells in a row of the pixel array 623 are all selected for read-out at the same time by a row select line, and each pixel cell in a selected column of the row provides a signal representative of received light to a column output line. That is, each column also has a select line, and the pixel cells of each column are selectively read out onto output lines in response to the column select lines. The row select lines in the pixel array 623 are selectively activated by a row driver 625 in response to a row address decoder 627. The column select lines are selectively activated by a column driver 629 in response to a column address decoder 631.

The imaging device 600 can also comprise a timing and controlling circuit 633, which generates one or more read-out control signals to control the operation of the various components in the imaging device 600. For example, the timing and controlling circuit 633 can control the address decoders 627 and 631 in any of various conventional ways to select the appropriate row and column lines for pixel signal read-out.

The electrical signals output from the column output lines typically include a pixel reset signal ($V_{RST}$) and a pixel image signal ($V_{Photo}$) for each pixel cell. In an example of a four-transistor CMOS imaging device 600, the pixel reset signal ($V_{RST}$) can be obtained from a corresponding floating diffusion region when it is reset by a reset signal RST applied to a corresponding reset transistor, while the pixel image signal ($V_{Photo}$) is obtained from the floating diffusion region when photo generated charge is transferred to the floating diffusion region. Both the $V_{RST}$ and $V_{Photo}$ signals can be read into a sample and hold circuit (S/H) 635. In one example, a differential signal ($V_{RST}-V_{Photo}$) can be produced by a differential amplifier (AMP) 637 for each pixel cell. Each pixel cell's differential signal can be digitized by an analog-to-digital converter (ADC) 639, which then outputs the digitized pixel data as the image data to an image processor 641. The image processor 641 can comprise appropriate circuits and image processing algorithms to process the image data and perform automatic exposure, automatic white balance, etc., based on the results from the test process described above.

The imaging device 600 may be combined with a processor, such as a CPU, digital signal processor, or microprocessor, with or without memory storage on a single integrated circuit or on a different chip than the processor. Those skilled in the art will appreciate that the imaging device 600 and its various components can be in various other forms and/or operate in various other ways. As noted above, although the imaging device 600 is illustrated as a CMOS image sensor, other types of image sensor cores and associated read out circuits may be used instead.

FIG. 7 shows another example of the imaging unit 500, which is an image capture device 700, e.g., a camera. The image capture device 700 can employ an imaging device 600, as is described above, for capturing an image and converting the captured image into electrical signals. As FIG. 7 shows, the image capture device 700 can generally comprise a central processing unit (CPU) 760, such as a microprocessor, which operates to control usual functionability of the image capture device 700 including flow of images captured by the imaging device 600. For example, the central processing unit 760 or the imaging device 600 can comprise appropriate circuits to carry out various image processing and perform automatic exposure, automatic white balance, etc., which can be adjusted based on the results from the test process described above. The CPU 760 can be also configured to communicate with an input/output (I/O) device 762 over a bus 764. In addition, the image capture device 700 can comprise a random access memory (RAM) 766, and/or a removable memory 768, such as a flash memory, which can communicate with CPU 760 over the bus 764.

The image capture device 700 can be any of various systems having digital circuits including the imaging device 600. Without being limiting, such an image capture device 700 could be in the form of a computer system having an imaging input, a digital camera, a scanner, a machine vision system, a vehicle navigation system, a cellular or video telephone system, a surveillance system, an automatic focus system, a star tracker system, a motion detection system, an image stabilization system, and other systems supporting image acquisition. In the example shown in FIG. 7, the image capture device 700 is employed in, for example, a digital camera 700', which has a camera body portion 770, a camera lens 772, a view finder 774, and a shutter release button 776. When depressed, the shutter release button 776 operates the lens 772 and/or the imaging device 600 so that light from an image is captured by the pixel array 623 (FIG. 6). As one skilled in the art will appreciate, the image capture device 700, the camera system 700', and other various components contained therein can also be formed and/or operate in various other ways.

As one skilled in the art will appreciate, the various features described herein may be used singly or in any combination thereof. Therefore, the embodiments are not limited to the embodiments specifically described herein. While the foregoing description and drawings represent examples of embodiments, it will be understood that various additions, modifications, and substitutions may be made therein as defined in the accompanying claims. In particular, it will be clear to those skilled in the art that other specific forms, structures, arrangements, proportions, materials can be used without departing from the essential characteristics thereof. The presently disclosed embodiments are therefore to be considered in all respects as illustrative and not restrictive.

What is claimed as new and desired to be protected by Letters Patent of the United States is:

1. A display device for displaying a high dynamic range image, the display device comprising:
   a housing;
   a plurality of image carriers supported by the housing;
   a plurality of rendered images formed from image data of a scene and each being affixed onto a respective one of the image carriers; and
   at least one light source for illuminating the rendered images on the image carriers, wherein when the rendered images are aligned with one another and illuminated by the light source, the rendered images are capable of forming a display image having a dynamic range higher than that of the individual rendered images, wherein the image carriers are formed of a transparent material, and wherein the rendered images are printed on the image carriers.

2. The display device of claim 1, wherein the display image has a luminance contrast of at least about 8500:1.

3. The display device of claim 1, wherein the at least one light source causes the display image to have a peak luminance level in a range from about 8,000 cd/m$^2$ to about 11,000 cd/m2.

4. The display device of claim 1, wherein the display image has a area size of about 101 cm×about 76 cm.

5. The display device of claim 1, wherein the image carriers are releasably fixed to a carrier support forming a unitary display panel.

6. The display device of claim 1, wherein each of the rendered images on a respective one of the image carriers is a positive image.

7. The display device of claim 1, wherein the light source generates a light simulating at least one of daylight, tungsten light, and fluorescent light.

8. A system for testing an imaging unit, the system comprising: a display device, which comprises:
   a housing;
   a plurality of image carriers supported by the housing;

a plurality of rendered images formed from image data of a scene and each being affixed onto a respective one of the image carriers;

at least one light source for illuminating the rendered images on the image carriers, wherein when the rendered images are aligned with one another and illuminated by the light source, the rendered images are capable of forming a display image having a dynamic range higher than that of the individual rendered images, wherein the image carriers are formed of a transparent material, and wherein the rendered images are printed on the image carriers; and an imaging unit placed facing the display image on the display device and spaced from the display image by a test distance L.

9. The system of claim 8, wherein the imaging unit comprises a pixel array with a resolution and the display image has a spatial resolution higher than the resolution of the pixel array.

10. The system of claim 8, wherein the imaging unit is a camera.

11. The system of claim 8, where the imaging unit is an imaging device for use in an imaging apparatus.

12. A method of forming a display image, the method comprising the steps of:
obtaining a high dynamic range image of a real scene;
processing image data of the high dynamic range image to render a device dependent image;
affixing the rendered image onto a respective image carrier of a plurality of image carriers, wherein the image carriers are formed of a transparent material and wherein the affixing step comprises printing the rendered image onto the plurality of image carriers;
aligning the rendered images on the plurality of image carriers; and
illuminating the aligned rendered images to generate a display image having a dynamic range higher than that of the individual rendered images.

13. The method of claim 12, wherein the obtaining step comprises:
capturing the real scene using different exposure levels to obtain a plurality of captured images;
combining the captured images to generate a combined image; and
converting the combined image to a device independent image for use by an image printing device.

14. The method of claim 13 further comprising obtaining spectral information of an illuminance source for the real scene at the same time capturing the real scene.

15. The method of claim 12, wherein the illuminating step comprises illuminating the aligned rendered images with an illuminance radiation substantially the same as that in the real scene captured.

16. The method of claim 12, wherein the illuminating step comprises using a light source having a spectrum substantially the same as that of an illuminance radiation in the real scene.

17. A method of testing an imaging unit, the method comprising the steps of:
providing a predetermined display image of a real scene, the display image having a luminance contrast of at least about 8500:1 and a peak luminance level in a range from about 8,000 $cd/m^2$ to about 11,000 $cd/m^2$, wherein providing the predetermined display image comprises:
providing a plurality of image carriers each carrying a printed image, wherein the image carriers are formed of a transparent material; and
aligning the image carriers; and
capturing the predetermined display image using an imaging unit to obtain test image data of the display image for testing the imaging unit.

18. The method of claim 17, wherein the display image is illuminated by a light source having substantially the same illuminance radiation as that in the real scene.

19. The method of claim 17, wherein the imaging unit comprises an imaging device for use in an imaging apparatus.

* * * * *